United States Patent
Yazaki

(10) Patent No.: US 12,026,571 B2
(45) Date of Patent: Jul. 2, 2024

(54) RFIC MODULE AND RFID TAG

(71) Applicant: Murata Manufacturing Co., Ltd., Nagaokakyo (JP)

(72) Inventor: Hirokazu Yazaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 126 days.

(21) Appl. No.: 17/660,078

(22) Filed: Apr. 21, 2022

(65) Prior Publication Data

US 2022/0245420 A1    Aug. 4, 2022

Related U.S. Application Data

(63) Continuation of application No. PCT/JP2020/034002, filed on Sep. 8, 2020.

(30) Foreign Application Priority Data

Nov. 22, 2019   (JP) ................................ 2019-211298

(51) Int. Cl.
    *G06K 19/077*      (2006.01)
    *G06K 19/07*       (2006.01)
    *H01Q 1/22*        (2006.01)

(52) U.S. Cl.
    CPC ... *G06K 19/07745* (2013.01); *G06K 19/0702* (2013.01); *H01Q 1/2283* (2013.01)

(58) Field of Classification Search
    CPC ..................... G06K 19/07745; G06K 19/0702

USPC .......................................................... 235/492
See application file for complete search history.

(56) References Cited

U.S. PATENT DOCUMENTS

| | | | |
|---|---|---|---|
| 10,812,145 B1 * | 10/2020 | Dehmubed | ............ H04B 5/0056 |
| 2017/0083804 A1 | 3/2017 | Kato et al. | |
| 2017/0237466 A1 | 8/2017 | Carr | |
| 2018/0114104 A1 | 4/2018 | Kato et al. | |
| 2019/0279062 A1 * | 9/2019 | Hung | ................... H01H 37/761 |
| 2023/0307841 A9 * | 9/2023 | Rokhsaz | .................. H01Q 9/04 |
| | | | 343/745 |

FOREIGN PATENT DOCUMENTS

| | | |
|---|---|---|
| JP | 2003271914 A | 9/2003 |
| JP | 2004070413 A | 3/2004 |
| JP | 2015142208 A | 8/2015 |
| JP | 2017102028 A | 6/2017 |
| WO | 2016084658 A1 | 6/2016 |

OTHER PUBLICATIONS

International Search Report issued for PCT/JP2020/034002, date of mailing Nov. 24, 2020.

* cited by examiner

*Primary Examiner* — Allyson N Trail
(74) *Attorney, Agent, or Firm* — ArentFox Schiff LLP

(57) ABSTRACT

An RFIC module is provided that includes a substrate, an RFIC mounted on the substrate and performing passive communication, and an impedance matching circuit formed on the substrate and performing impedance matching between the RFIC and an antenna. Further, the RFIC module includes a chip capacitor as an imparting circuit other than the RFIC on the substrate.

20 Claims, 19 Drawing Sheets

RFIC MODULE AND RFID TAG

CROSS REFERENCE TO RELATED APPLICATIONS

The present application is a continuation of PCT/JP2020/034002 filed Sep. 8, 2020, which claims priority to Japanese Patent Application No. 2019-211298, filed Nov. 22, 2019, the entire contents of each of which are incorporated herein by reference.

TECHNICAL FIELD

The present invention relates to a radio frequency integrated circuit (RFIC) module and a radio frequency identifier (RFID) tag including the RFIC module.

BACKGROUND

An RFID system including an RFID tag attached to an article and a reader/writer that performs reading and writing for the RFID tag is currently used as an article information management system.

WO 2016/084658 A (hereinafter "Patent Literature 1") discloses an RFID tag including a conductor acting as an antenna and an RFIC module coupled to the conductor. Such an RFID tag includes an RFIC chip that stores predetermined information and processes a predetermined radio signal, and an antenna element (e.g., a radiator) that transmits and receives a high-frequency signal, and is used by being affixed to various articles (or packaging materials thereof) to be managed.

A basic function of a conventional passive tag, such as a passive RFID tag disclosed in Patent Literature 1, is to include an RFIC in which ID information is written and to return the ID information in response to a command from a reader/writer that is a device on a communication counterpart. In the passive tag, a simple operation of only returning ID information is performed, and thus the passive tag is basically a single-function RFID tag including a one-chip RFIC and a radiating element.

SUMMARY OF THE INVENTION

In contrast, it is an object of the present invention to provide an RFIC module that enhances the functionality of an RFID tag and the functionality of an RFID tagged article, and an RFID tag including the RFIC module.

In an exemplary aspect, an RFIC module is provided that includes a substrate, an RFIC mounted on the substrate and for performing passive communication, an RFIC-side terminal electrode to which the RFIC is connected, antenna-side terminal electrodes formed on the substrate and each directly connected or capacitively coupled to an antenna, an impedance matching circuit formed on the substrate and connected to the RFIC-side terminal electrode and the antenna-side terminal electrodes, and an imparting circuit other than the RFIC, which is also disposed on the substrate.

Moreover, an exemplary RFID tag of the present disclosure includes a radiating element and an RFIC module. The configuration of the RFIC module is as described above.

According to the exemplary aspects of the present invention, an RFIC module is provided for enhancing the functionality of an RFID tag and the functionality of an RFID tagged article. Moreover, an RFID tag including the RFIC module is also provided.

DETAILED DESCRIPTION OF EMBODIMENTS

First Exemplary Embodiment

Figure 1A:
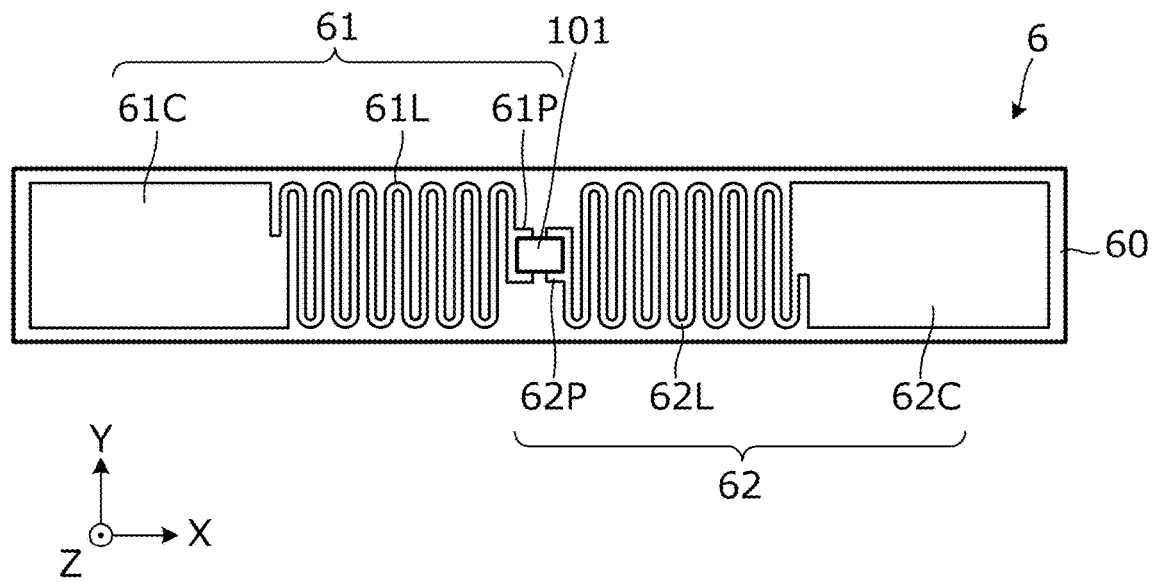
FIG. 1A is a plan view of an RFID tag 201 according to a first exemplary embodiment.
Figure 1B:
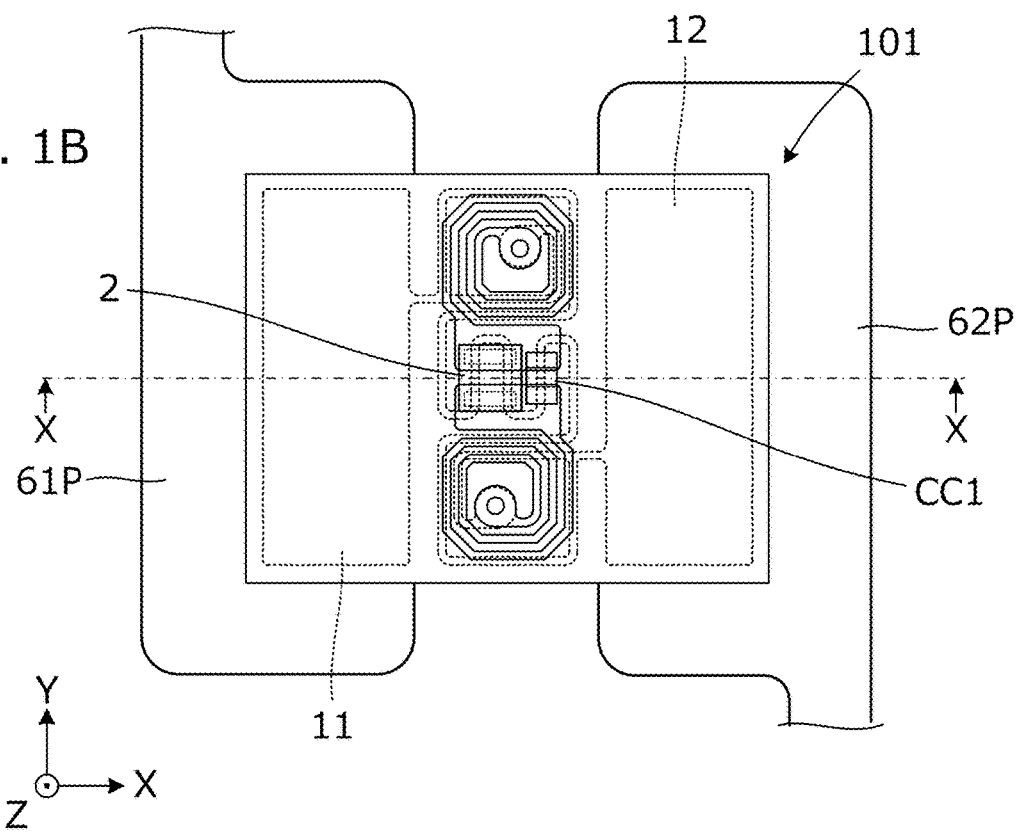
FIG. 1B is an enlarged plan view of a mounting portion of an RFIC module 101 included in the RFID tag 201.

FIG. 1A is a plan view of an RFID tag 201 according to the first exemplary embodiment. FIG. 1B is an enlarged plan view of a mounting portion of an RFIC module 101 included in the RFID tag 201.

As shown, the RFID tag 201 includes an antenna 6 and the RFIC module 101 coupled to the antenna 6. The antenna 6 includes an insulator film 60 and conductor patterns 61 and 62 formed on the insulator film 60. The insulator film 60 is, for example, a polyethylene terephthalate (PET) film, and the conductor patterns 61 and 62 are, for example, patterns of aluminum foil.

The conductor pattern 61 includes conductor patterns 61P, 61L, and 61C, and the conductor pattern 62 similarly includes conductor patterns 62P, 62L, and 62C. Collectively, the conductor patterns 61 and 62 form a dipole antenna.

The RFIC module 101 is mounted on the conductor patterns 61P and 62P. The conductor patterns 61L and 62L have a meander line shape and act as a region having a high inductance component. In addition, the conductor patterns 61C and 62C have a planar shape and act as a region having a high capacitance component. In this configuration of the conductor patterns 61 and 62 of the antenna, the region having high current intensity has an increased inductance component and the region having high voltage intensity has an increased capacitance component, so that the region where the conductor patterns 61 and 62 of the antenna are formed is reduced.

Figure 2:
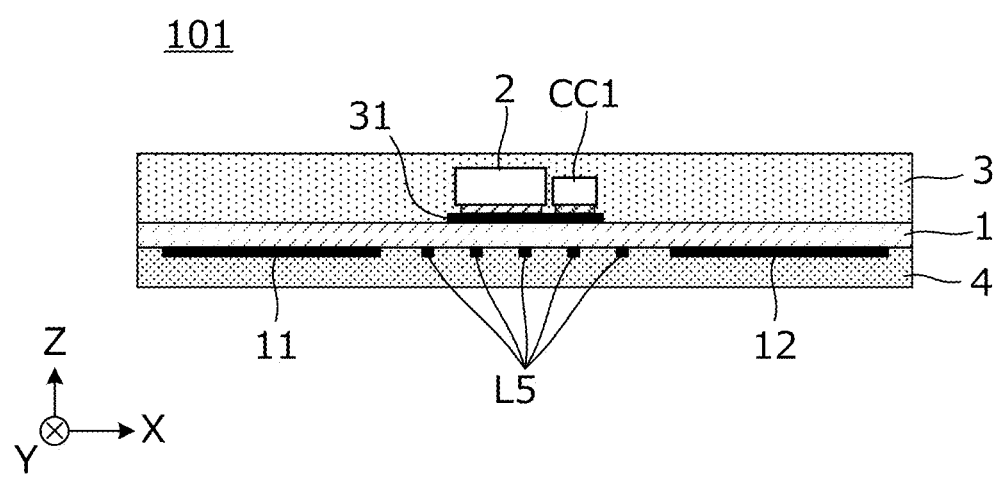
FIG. 2 is a cross-sectional view of the RFIC module 101.

FIG. 2 is a cross-sectional view of the RFIC module 101. The RFIC module 101 includes a substrate 1, and an RFIC 2 and a chip capacitor CC1 mounted on the substrate 1. The chip capacitor CC1 is an example of a circuit element according to the exemplary embodiment. The substrate 1 is a flexible substrate such as polyimide, for example. The upper face of the substrate 1 on which the RFIC 2 and the chip capacitor CC1 are mounted is covered with a protective film 3. The protective film 3 is, for example, a hot melt agent such as an elastomer such as polyurethane, and ethylene vinyl acetate (EVA). A cover lay film 4 is provided on the lower face of the substrate 1. The cover lay film 4 is, for example, a polyimide film. Therefore, all of the substrate 1, the protective film 3, and the cover lay film 4 are soft, and the entire RFIC module 101 is soft.

Figure 3:
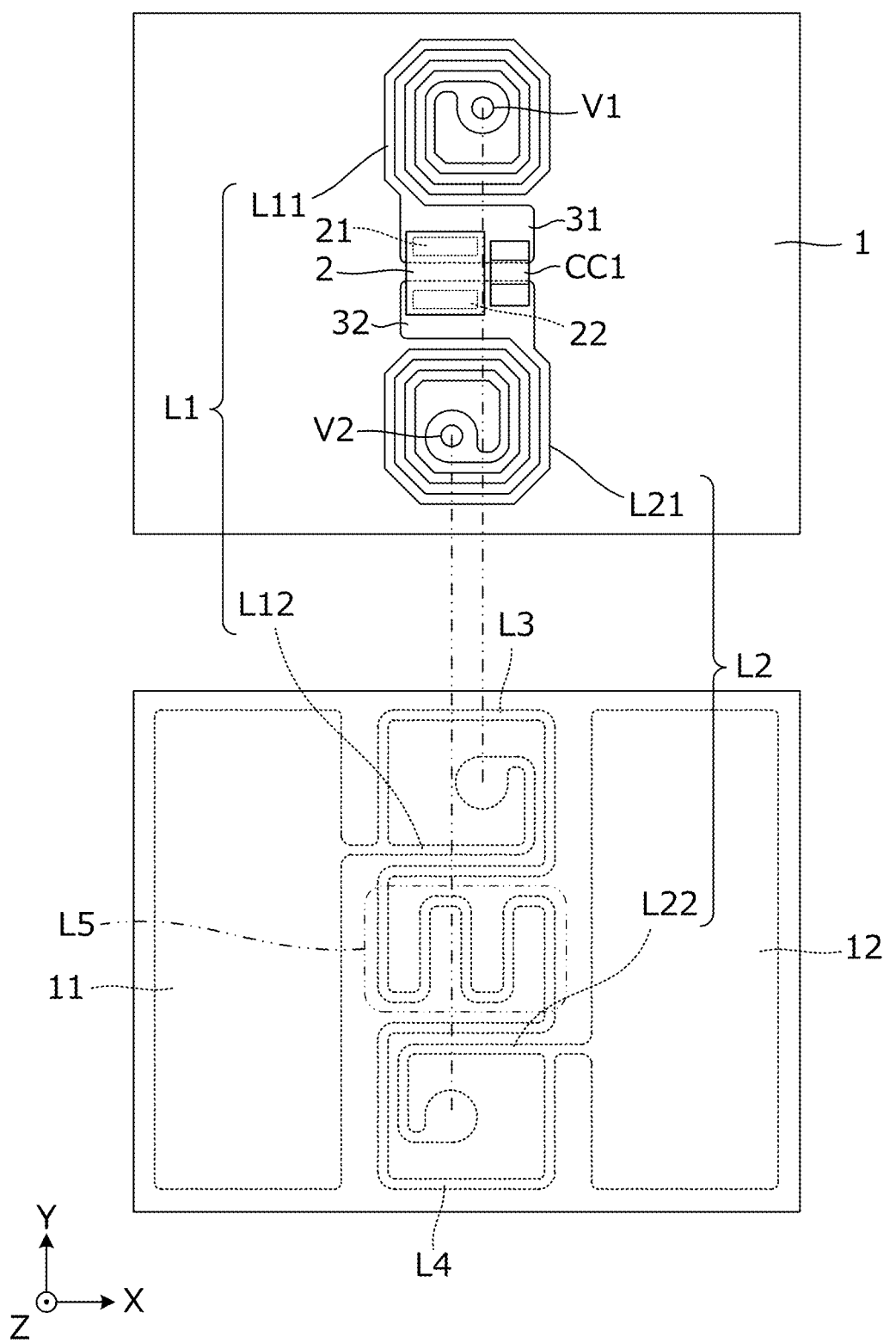
FIG. 3 is a plan view illustrating a conductor pattern formed on each layer of the substrate 1 of the RFIC module 101.

FIG. 3 is a plan view illustrating a conductor pattern formed on the substrate 1 of the RFIC module 101. In FIG. 3, the upper part is a plan view of a conductor pattern formed on the upper face of the substrate 1, and the lower part of FIG. 3 is a plan view of a conductor pattern formed on the lower face of the substrate 1.

On the upper face of the substrate 1, an RFIC-side first terminal electrode 31, an RFIC-side second terminal electrode 32, a conductor pattern L11 as the main part of a first inductor L1, and a conductor pattern L21 as the main part of a second inductor L2 are formed. Moreover, the RFIC-side first terminal electrode 31 is connected to one end of the conductor pattern L11, and the RFIC-side second terminal electrode 32 is connected to one end of the conductor pattern L21. In an exemplary aspect, these conductor patterns are obtained by patterning a copper foil by photolithography, for example.

An antenna-side first terminal electrode 11 and an antenna-side second terminal electrode 12 capacitively coupled to the conductor patterns 61P and 62P of the antenna 6 are formed on the lower face of the substrate 1. On the lower face of the substrate 1, a conductor pattern L12 of part of the first inductor L1, a conductor pattern L22 of part of the second inductor L2, a conductor pattern of a third inductor L3, a conductor pattern of a fourth inductor L4, and a conductor pattern of a fifth inductor L5 (i.e., the conductor patterns surrounded by two-dot chain lines) are formed. These conductor patterns are also obtained by patterning a copper foil by photolithography, for example.

One end of the conductor pattern L12 of part of the first inductor L1 and one end of the conductor pattern of the third inductor L3 are connected to the antenna-side first terminal electrode 11. Similarly, one end of the conductor pattern L22 of part of the second inductor L2 and one end of the conductor pattern of the fourth inductor L4 are connected to the antenna-side second terminal electrode 12. The conductor pattern of the fifth inductor L5 is connected between the other end of the conductor pattern of the third inductor L3 and the other end of the conductor pattern of the fourth inductor L4.

The other end of the conductor pattern L12 of the first inductor L1 and the other end of the conductor pattern L11 as the main part of the first inductor L1 are connected via a via conductor V1. Similarly, the other end of the conductor pattern L22 of the second inductor L2 and the other end of the conductor pattern L21 as the main part of the second inductor L2 are connected via a via conductor V2.

As further shown, the RFIC 2 is mounted on the RFIC-side first terminal electrode 31 and the RFIC-side second terminal electrode 32. That is, a terminal 21 of the RFIC 2 is connected to the RFIC-side first terminal electrode 31, and a terminal 22 of the RFIC 2 is connected to the RFIC-side second terminal electrode 32. The chip capacitor CC1 is mounted on the RFIC-side first terminal electrode 31 and the RFIC-side second terminal electrode 32, and the chip capacitor CC1 is connected between the RFIC-side first terminal electrode 31 and the RFIC-side second terminal electrode 32.

The first inductor L1 and the third inductor L3 are formed in different layers of the substrate 1, and are disposed in a relationship in which the coil openings overlap. Similarly, the second inductor L2 and the fourth inductor L4 are formed in different layers of the substrate 1, and are disposed in a relationship in which the coil openings overlap. The second inductor L2 and the fourth inductor L4, and the first inductor L1 and the third inductor L3 are disposed in a positional relationship of sandwiching the mounting positions of the RFIC 2 and the chip capacitor CC1 along the face of the substrate 1.

Further, the winding direction from the RFIC-side first terminal electrode 31 to the other end of the third inductor L3 is the same as the winding direction from the RFIC-side second terminal electrode 32 to the other end of the fourth inductor L4. In the direction shown in FIG. 3, both are in the right turning direction. It can also be said that the set of the first inductor L1 and the third inductor L3 and the set of the second inductor L2 and the fourth inductor L4 are 180° rotationally symmetric with respect to the mounting position of the RFIC 2 according to the exemplary aspect.

Figure 4:
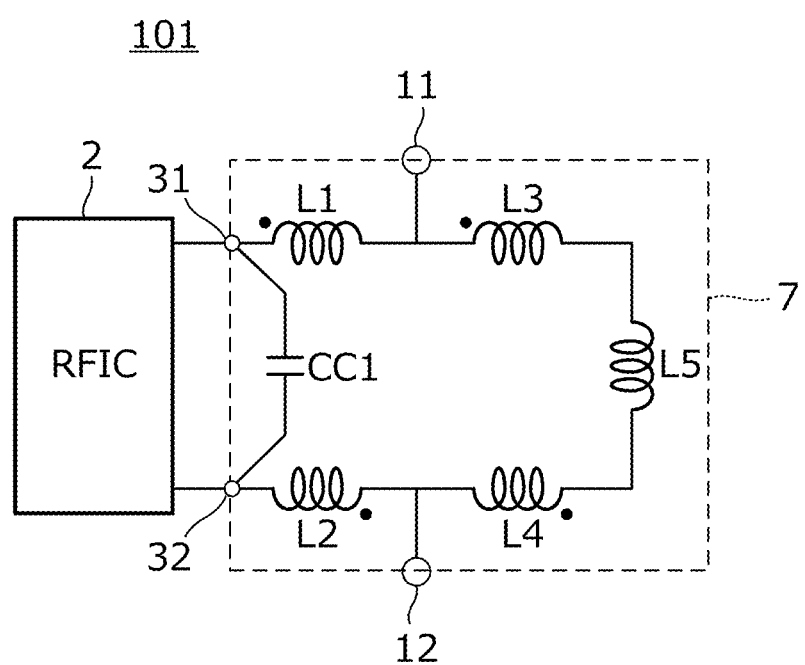
FIG. 4 is a circuit diagram of the RFIC module 101.

FIG. 4 is a circuit diagram of the RFIC module 101. The RFIC module 101 includes the RFIC 2 that performs passive communication and an impedance matching circuit 7. The impedance matching circuit 7 is connected to the RFIC-side first terminal electrode 31, the RFIC-side second terminal electrode 32, the antenna-side first terminal electrode 11, and the antenna-side second terminal electrode 12. The impedance matching circuit 7 includes the first inductor L1, the second inductor L2, the third inductor L3, the fourth inductor L4, the fifth inductor L5, and the chip capacitor CC1. In addition, the chip capacitor CC1 is connected between the RFIC-side first terminal electrode 31 and the RFIC-side second terminal electrode 32 and thus in parallel to RFIC 2.

The first inductor L1 includes the conductor patterns L11 and L12 illustrated in FIG. 3, and the second inductor L2 includes the conductor patterns L21 and L22 illustrated in FIG. 3. The first inductor L1 is connected between the antenna-side first terminal electrode 11 and the RFIC-side first terminal electrode 31. The second inductor L2 is connected between the antenna-side second terminal electrode 12 and the RFIC-side second terminal electrode 32. One end of the third inductor L3 is connected to the antenna-side first terminal electrode 11, one end of the fourth inductor L4 is connected to the antenna-side second terminal electrode 12, and the fifth inductor L5 is connected between the other end of the third inductor L3 and the other end of the fourth inductor L4.

Figure 5:
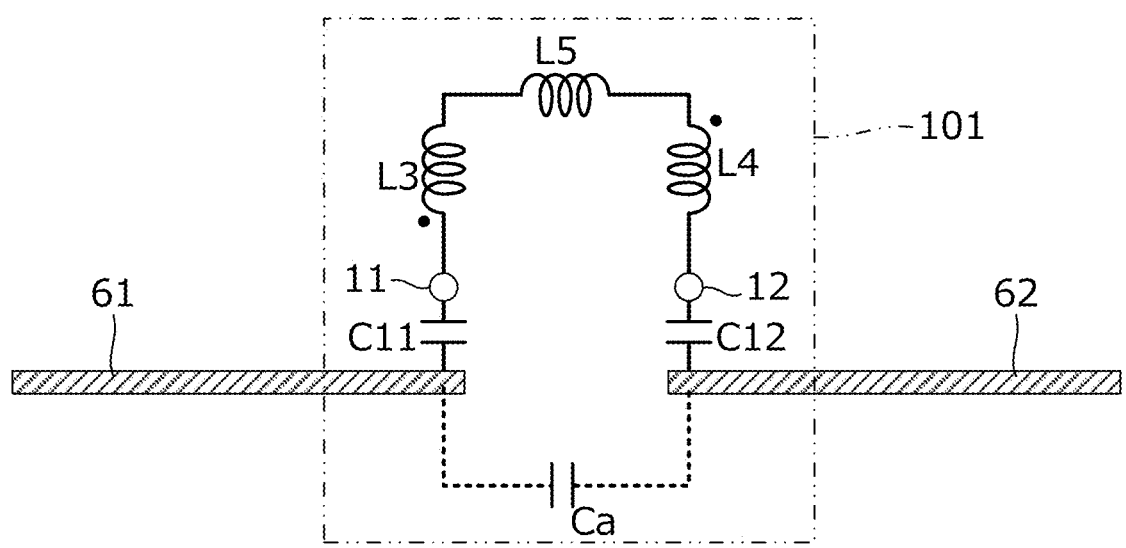
FIG. 5 is a diagram illustrating capacitance generated between a third inductor L3, a fourth inductor L4, and a fifth inductor L5, and conductor patterns 61 and 62 of the antenna.

FIG. 5 is a diagram illustrating capacitance generated between the third inductor L3, the fourth inductor L4, and the fifth inductor L5, and the conductor patterns 61 and 62 of the antenna. As shown, a capacitor Ca in FIG. 5 is a capacitance component generated between the conductor patterns 61 and 62 of the antenna. A capacitor C11 is a capacitance component generated between conductor pattern 61 of the antenna and the antenna-side first terminal electrode 11, and a capacitor C12 is a capacitance component generated between conductor pattern 62 of the antenna and the antenna-side second terminal electrode 12. In addition, the inductances of the inductors L3 and L4 and the capacitances of the capacitors Ca, C11, and C12 form a parallel resonance circuit. According to the exemplary aspect, the resonance frequency of the resonance circuit is matched with the center frequency of the communication frequency band of the RFID tag.

In the present embodiment, the chip capacitor CC1 is part of the impedance matching circuit 7. The capacitances of the capacitors Ca, C11, and C12 illustrated in FIG. 5 are determined by the configuration of the conductor pattern of the RFIC module 101 and are constant. On the other hand, the characteristics of the RFIC 2 mounted on the substrate 1 are not necessarily constant. Under such circumstances, in order to appropriately perform impedance matching between the impedance of the input/output unit of the RFIC 2 and the antenna by the conductor patterns 61 and 62, the chip capacitor CC1 having a capacitance according to the characteristics of the RFIC 2 is selected. Therefore, according to the present embodiment, a plurality of types of RFICs 2 can be adopted having different impedances of the input/output unit.

Second Exemplary Embodiment

In the second embodiment, an example of an RFIC module and an RFID tag configured for mounting a chip capacitor according to characteristics of an antenna will be described.

Figure 6A:
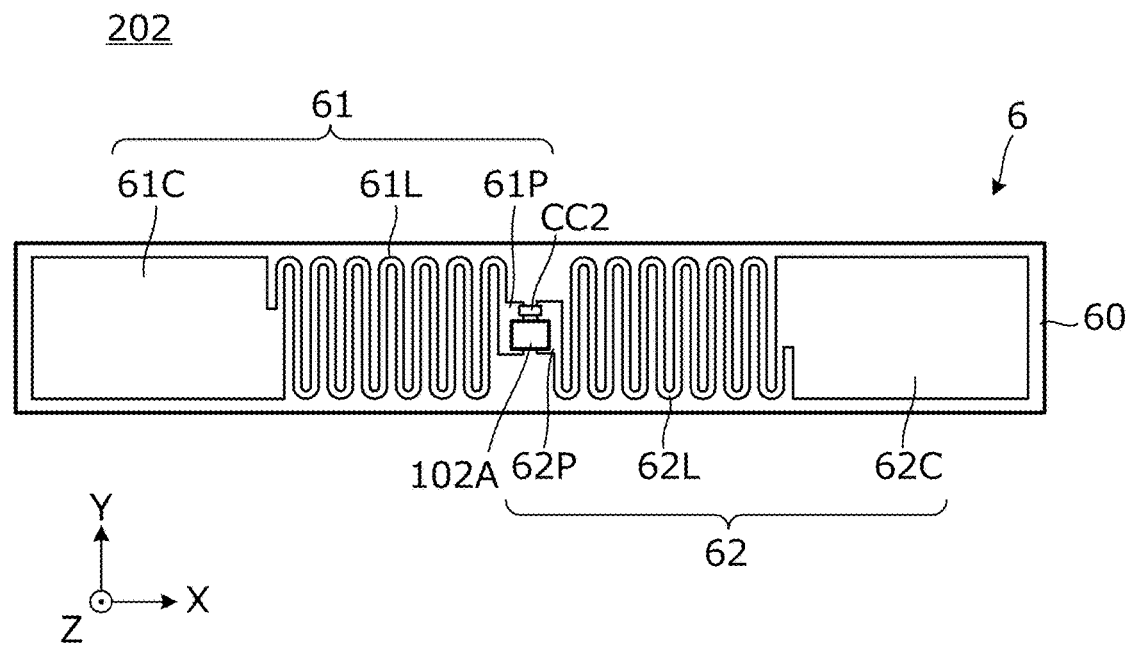
FIG. 6A is a plan view of an RFID tag 202 according to a second exemplary embodiment.
Figure 6B:
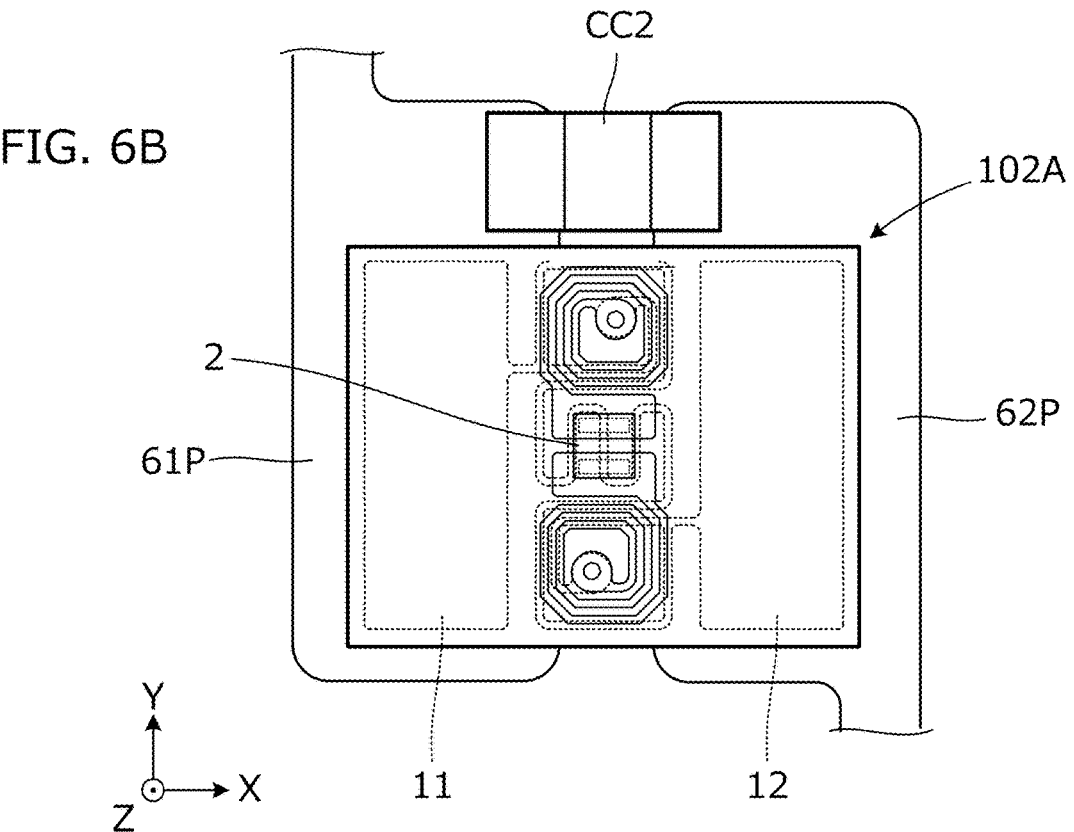
FIG. 6B is an enlarged plan view of a mounting portion of an RFIC module 102A included in the RFID tag 202.

FIG. 6A is a plan view of an RFID tag 202 according to the second exemplary embodiment. FIG. 6B is an enlarged plan view of a mounting portion of an RFIC module 102A included in the RFID tag 202.

As shown, the RFID tag 202 includes the antenna 6 and the RFIC module 102A coupled to the antenna 6. The antenna 6 also includes the insulator film 60 and the conductor patterns 61 and 62 formed on the insulator film 60.

As in the example described in the first embodiment, the conductor pattern 61 includes conductor patterns 61P, 61L, and 61C, and the conductor pattern 62 includes conductor patterns 62P, 62L, and 62C. Collectively, the conductor patterns 61 and 62 form a dipole antenna.

The RFIC module 102A and a chip capacitor CC2 are mounted on the conductor patterns 61P and 62P. The chip capacitor CC2 is an example of a circuit element according to the exemplary aspect.

Figure 7:
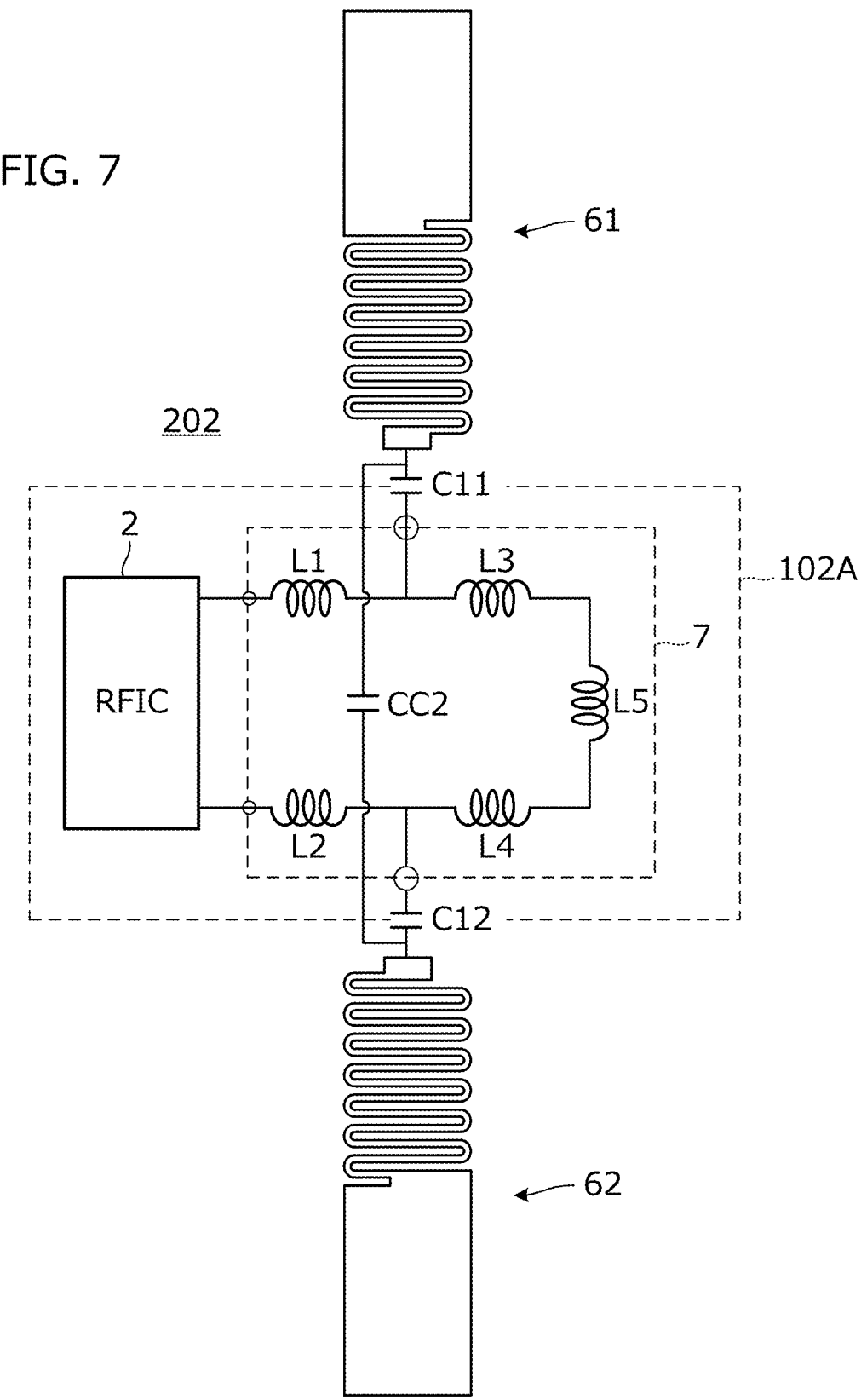
FIG. 7 is a circuit diagram of the RFID tag 202.

FIG. 7 is a circuit diagram of the RFID tag 202. The RFIC module 102A includes the RFIC 2 and the impedance matching circuit 7. The impedance matching circuit 7 includes the first inductor L1, the second inductor L2, the third inductor L3, the fourth inductor L4, and the fifth inductor L5 as described above. As further shown, the chip capacitor CC2 is connected between the root portion of the conductor pattern 61 and the root portion of the conductor pattern 62.

In this aspect, the chip capacitor CC2 is connected in parallel to the capacitor Ca that is a capacitance component generated between the conductor patterns 61 and 62 of the antenna illustrated in FIG. 5.

In the second embodiment, the capacitances of the capacitors Ca, C11, and C12 illustrated in FIG. 5 are determined by the configuration of the conductor pattern of the RFIC module 102A, and are constant. On the other hand, the antenna 6 and the RFIC module 102A are individual components, and can be independently designed. According to the present embodiment, since the value of the capacitor Ca, which is a capacitance component generated between the conductor patterns 61 and 62, can be changed by the capacitance of the chip capacitor CC2, the conductor patterns 61 and 62 of the antenna 6 are not necessarily constant. That is, under such a situation, the chip capacitor CC2 having a capacitance according to the conductor patterns 61 and 62 can be selected and mounted.

Figure 8:
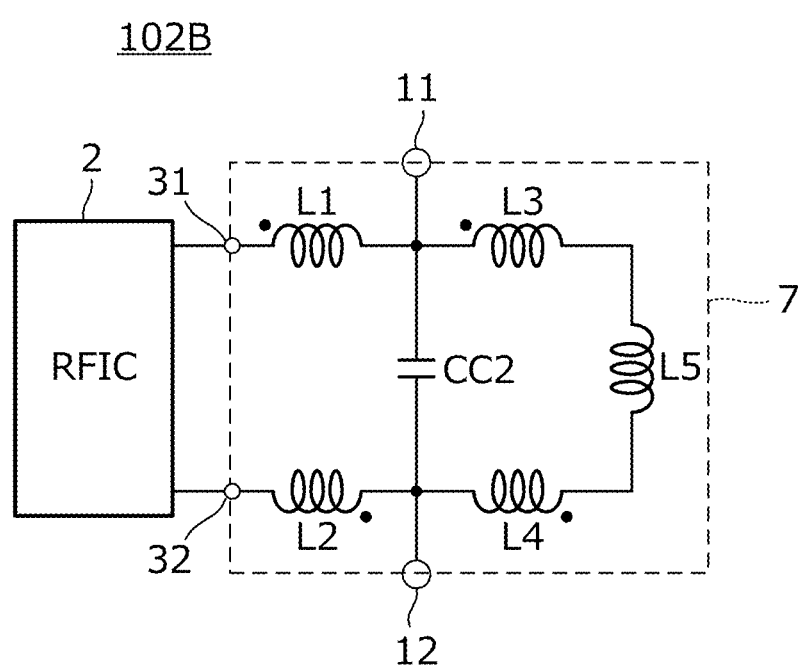
FIG. 8 is a circuit diagram of another RFIC module 102B according to the second exemplary embodiment.

FIG. 8 is a circuit diagram of another RFIC module 102B according to the second exemplary embodiment. The RFIC module 102B includes the RFIC 2 and the impedance matching circuit 7. The impedance matching circuit 7 includes the first inductor L1, the second inductor L2, the third inductor L3, the fourth inductor L4, the fifth inductor L5, and the chip capacitor CC2 as described above. Moreover, the chip capacitor CC2 is connected between the antenna-side first terminal electrode 11 and the antenna-side second terminal electrode 12. According to the present embodiment, since the capacitance between the antenna-side first terminal electrode 11 and the antenna-side second terminal electrode 12 can be changed by the capacitance of the chip capacitor CC2, the conductor patterns 61 and 62 of the antenna 6 are not necessarily constant. That is, under such a situation, the chip capacitor CC2 having a capacitance according to the conductor patterns 61 and 62 can be selected and mounted.

Third Exemplary Embodiment

In the third embodiment, an example of an RFIC module including a sensor and a battery will be described.

Figure 9:
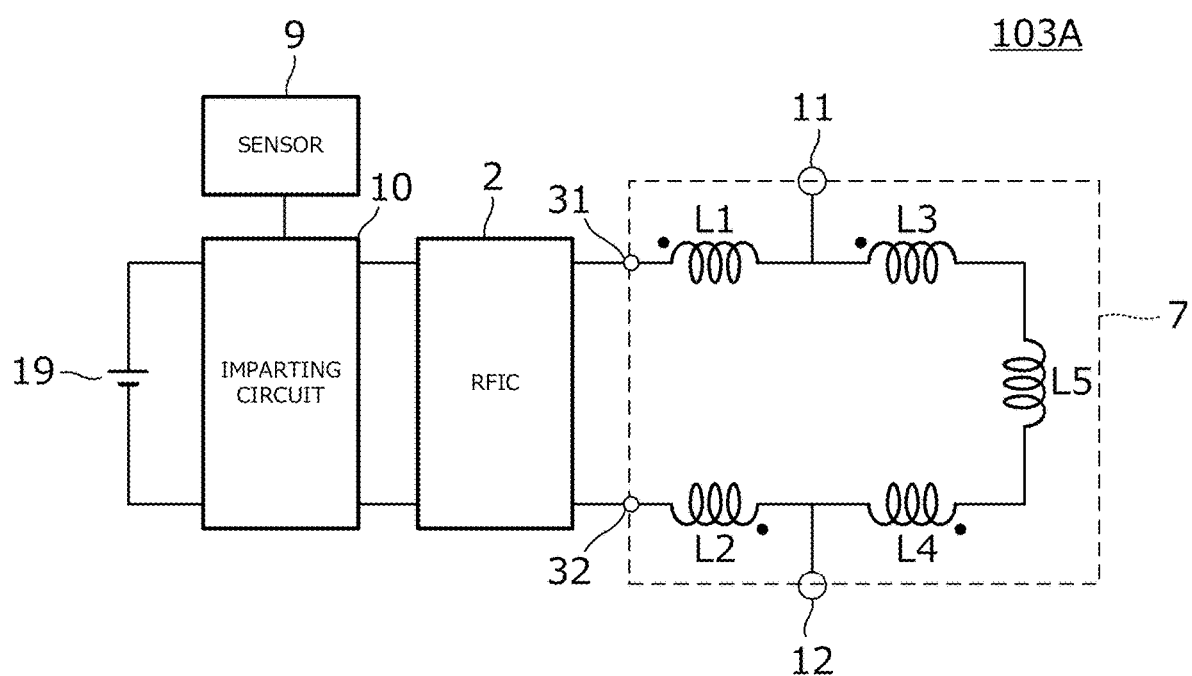
FIG. 9 is a circuit diagram of an RFIC module 103A according to a third exemplary embodiment.

FIG. 9 is a circuit diagram of an RFIC module 103A according to the third exemplary embodiment. The RFIC module 103A includes the RFIC 2, the impedance matching circuit 7, an imparting circuit 10, a sensor 9, and a battery 19.

Figure 10:
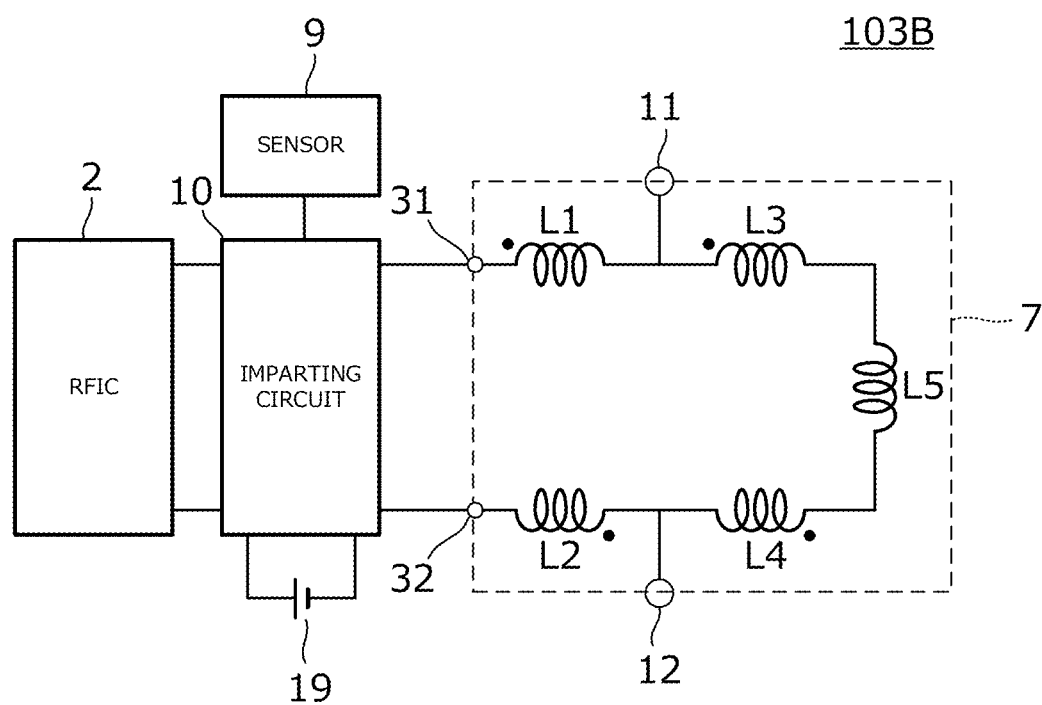
FIG. 10 is a circuit diagram of another RFIC module 103B according to the third exemplary embodiment.

FIG. 10 is a circuit diagram of another RFIC module 103B according to the third embodiment. As shown, the RFIC module 103B includes the RFIC 2, the impedance matching circuit 7, the imparting circuit 10, the sensor 9, and the battery 19. Unlike the example illustrated in FIG. 9, the imparting circuit 10 is provided between the RFIC 2 and the impedance matching circuit 7.

In FIGS. 9 and 10, the sensor 9 is a sensor configured to detect a variable to be measured of an external environment, such as a temperature, a humidity, an acceleration, an inclination, a pressure, a bending strain, a received light amount, a received light wavelength, a sound volume, a received sound frequency, various gases, or static electricity, for example. The imparting circuit 10 is a circuit that configured to impart a function other than returning the ID information to the RFIC module 103A. The imparting circuit 10 operates by the battery 19 as a power source, and operates according to the variable to be measured of the external environment by the sensor 9.

In the RFIC module 103A illustrated in FIG. 9, when the variable to be measured by the sensor 9 falls within a predetermined range or goes out of the predetermined range, enabling/disabling the operation of the RFIC 2 is switched. That is, the potential of the enable terminal of the RFIC 2 is switched under the control of the imparting circuit 10.

In the RFIC module 103B illustrated in FIG. 10, enabling/disabling the operation of the RFIC 2 is switched when the variable to be measured by the sensor 9 falls within a predetermined range or falls outside the predetermined range. That is, whether to connect the RFIC 2 and the impedance matching circuit 7 via the imparting circuit 10 is switched.

In the third embodiment, for example, when the sensor 9 is a temperature sensor and the external environment is in a normal room temperature state, the RFIC 2 is enabled. As a result, when the article to which the RFID tag is attached is in a frozen state or a refrigerated state, the article can be regarded as not existing equivalently. Conversely, it is also possible to disable the RFID tag for an article at room temperature.

Further, for example, when the sensor 9 is an acceleration sensor and the article to which the RFID tag is attached is in a stationary state, the RFIC 2 is enabled. As a result, when the article to which the RFID tag is attached is in a vibration state or a rotation state, the article can be regarded as not existing equivalently. Conversely, it is also possible to disable the RFID tag for an article in a stationary state.

When other sensors are provided, enabling/disabling the RFID tag of the RFID tagged article can be similarly switched according to the variable to be measured.

Fourth Exemplary Embodiment

In the fourth exemplary embodiment, an example of an RFIC module configured to switch characteristics of an impedance matching circuit by an imparting circuit will be described.

Figure 11:
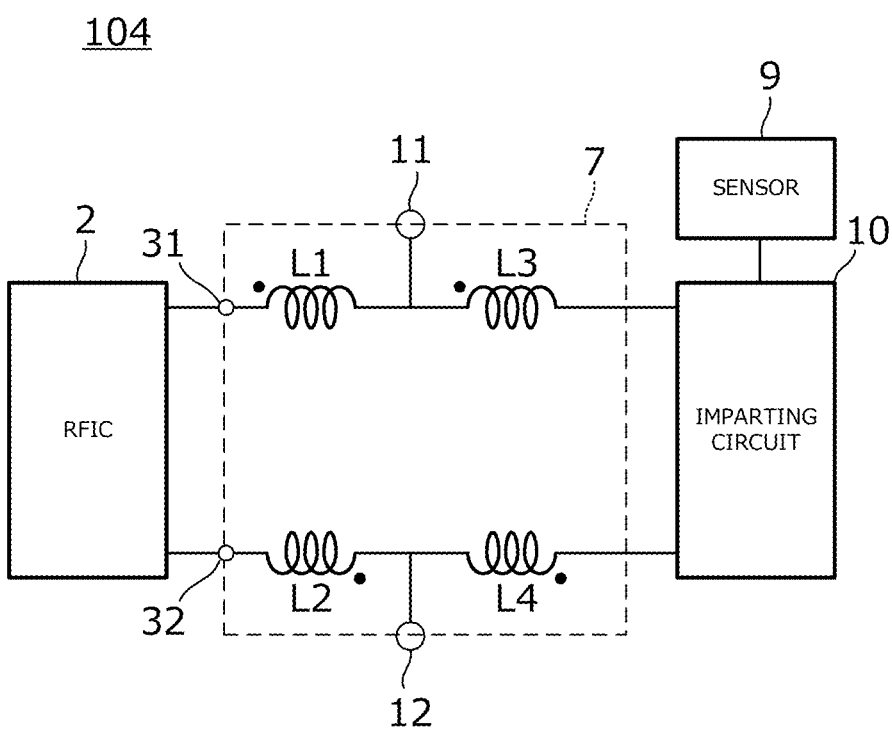
FIG. 11 is a circuit diagram of an RFIC module 104 according to a fourth exemplary embodiment.

FIG. 11 is a circuit diagram of an RFIC module 104 according to the fourth embodiment. The RFIC module 104 includes the RFIC 2, the impedance matching circuit 7, the imparting circuit 10, and the sensor 9.

The impedance matching circuit 7 includes the first inductor L1, the second inductor L2, the third inductor L3, and the fourth inductor L4 as described above. The imparting circuit 10 is connected to a position corresponding to the inductor L5 of the impedance matching circuit described above.

In FIG. 11, the sensor 9 is a sensor that detects a variable to be measured of an external environment such as a temperature, a humidity, an acceleration, an inclination, a pressure, a bending strain, a received light amount, a received light wavelength, a sound volume, a received sound frequency, various gases, or static electricity. In this aspect, the imparting circuit 10 operates according to a variable to be measured of the external environment by the sensor 9.

In the RFIC module 104 illustrated in FIG. 11, when the variable to be measured by the sensor 9 falls within a predetermined range or goes out of the predetermined range, the inductance connected between the inductor L3 and the inductor L4 is switched. As a result, the characteristics of the impedance matching circuit 7 are switched as follows. It is noted that, in this example, the imparting circuit 10 generates the power supply voltage by rectifying and smoothing the electromotive force induced to the inductors L1 to L4 of the impedance matching circuit 7 in a state of being close to the communication counterpart antenna, but may include a battery for power supply in another exemplary aspect.

Figure 12:
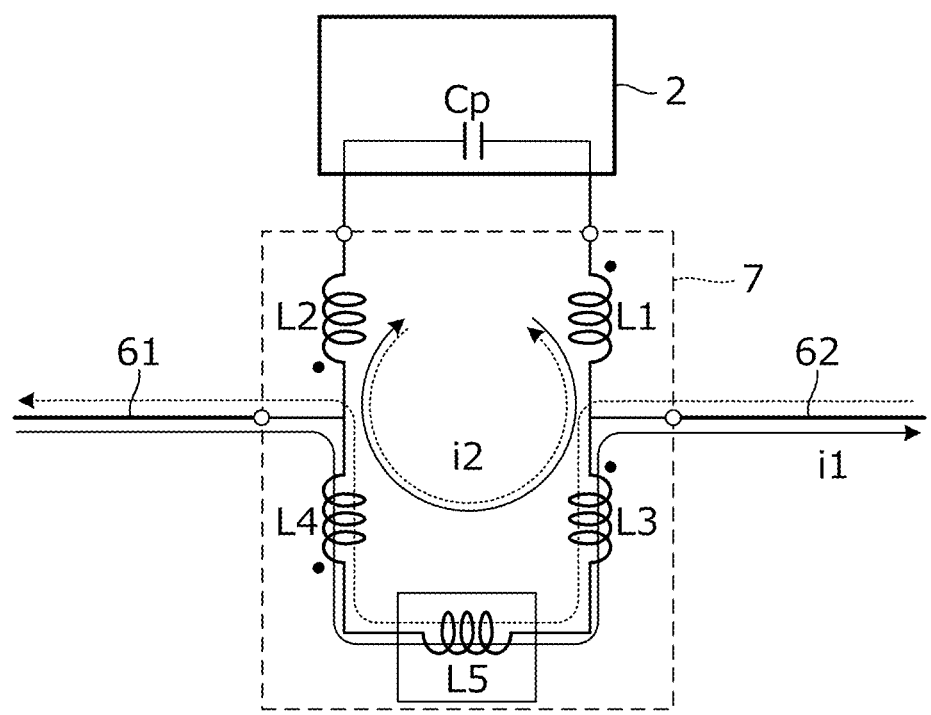
FIG. 12 is a circuit diagram illustrating a relationship between an RFIC 2, an impedance matching circuit, and conductor patterns 61 and 62.
Figure 13:
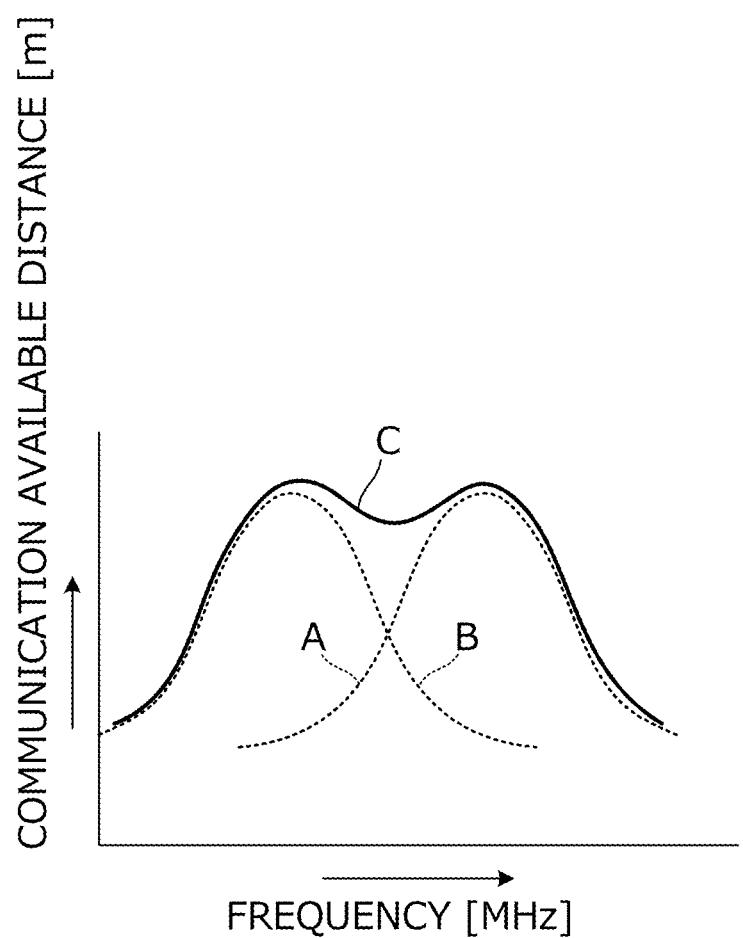
FIG. 13 is a diagram illustrating two resonance frequencies generated by the impedance matching circuit.

FIG. 12 is a circuit diagram illustrating a relationship between the RFIC 2, the impedance matching circuit 7, and the conductor patterns 61 and 62. FIG. 13 is a diagram illustrating two resonance frequencies generated by the impedance matching circuit.

A parasitic capacitance (e.g., a stray capacitance) Cp exists in the RFIC 2, and two resonances occur in the RFIC module. The first resonance is a resonance generated in a current path including the conductor patterns 61 and 62, the inductor L3, the inductor L4, and the inductor L5, and the second resonance is a resonance generated in a current path (e.g., a current loop) including the inductors L1 to L5 and the parasitic capacitance Cp. The two resonances are coupled by the inductors L3, L4, and L5 shared by the respective current paths, and two currents i1 and i2 respectively corresponding to the two resonances flow as shown in FIG. 12.

Both the first resonance frequency and the second resonance frequency are affected by the inductors L3 to L5. A difference of several 10 MHz (specifically, about 5 to 50 MHz) is generated between the first resonance frequency and the second resonance frequency. These resonance frequency characteristics are expressed by a curve A and a curve B in FIG. 13. By combining the two resonances having such resonance frequencies, a broadband resonance frequency characteristic as indicated by a curve C in FIG. 13 is obtained.

Moreover, the imparting circuit 10 illustrated in FIG. 11 controls the inductance of the inductor L5 in FIG. 12. As a result, the two resonance frequencies are controlled, the center frequencies of the two resonance characteristic curves A and B illustrated in FIG. 13 are displaced, and the bandwidth of the characteristic curve C is controlled.

Therefore, the bandwidth is switched according to the detection result of the sensor 9. For example, when the sensor 9 is a sensor that detects the amount of moisture, and it is detected that the amount of moisture around the antenna exceeds a certain amount, the bandwidth is widened. As a result, matching is maintained in response to impedance variation of the antenna due to moisture.

Fifth Exemplary Embodiment

In the fifth exemplary embodiment, an example of an RFIC module including an imparting circuit that uses an antenna or an impedance matching circuit used by an RFID tag will be described.

Figure 14:
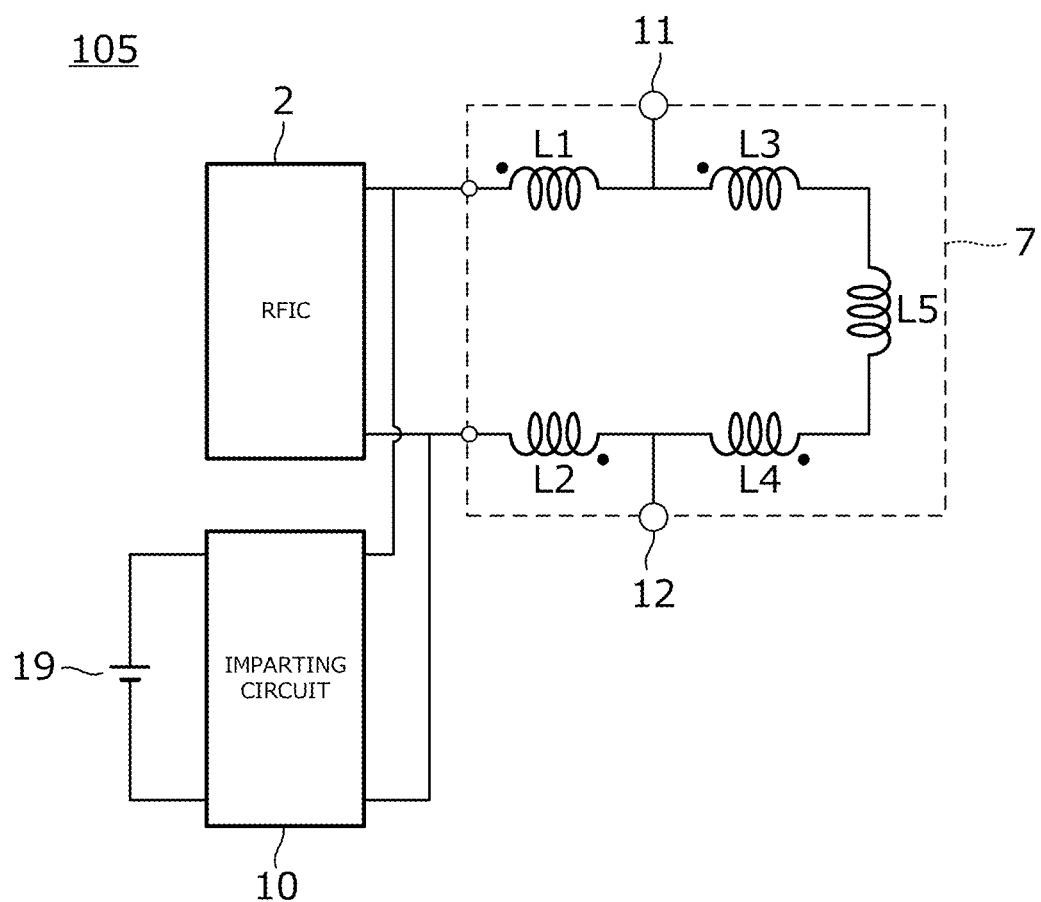
FIG. 14 is a circuit diagram of an RFIC module 105 according to a fifth exemplary embodiment.

In particular, FIG. 14 is a circuit diagram of an RFIC module 105 according to the fifth embodiment. As shown, the RFIC module 105 includes the RFIC 2, the impedance matching circuit 7, the imparting circuit 10, and the battery 19. The imparting circuit 10 is connected to a connection portion between the RFIC 2 and the impedance matching circuit 7.

In this aspect, the imparting circuit 10 is configured to perform a predetermined operation using an antenna connected to the antenna-side first terminal electrode 11 and the antenna-side second terminal electrode 12 via the impedance matching circuit 7. For example, the following operation is performed.

(1) An RFID operation different from the RFID tag operation by the RFIC 2 is performed.

(2) The inductors L1 to L5 of the impedance matching circuit 7 are used as a coil antenna to perform communication.

(3) A DC voltage is generated by rectifying and smoothing the electromotive force induced to the inductors L1 to L5 of the impedance matching circuit 7, and the battery 19 is charged.

(4) A DC voltage is generated by rectifying and smoothing the voltage induced in the antenna connected to the antenna-side first terminal electrode 11 and the antenna-side second terminal electrode 12, and the battery 19 is charged.

In an exemplary aspect, the battery 19 can be a capacitor, such as an electric double layer capacitor, for example.

Sixth Exemplary Embodiment

In the sixth exemplary embodiment, an example of an RFIC module having a filter circuit and an RFID tag including the RFIC module will be described.

Figure 15:
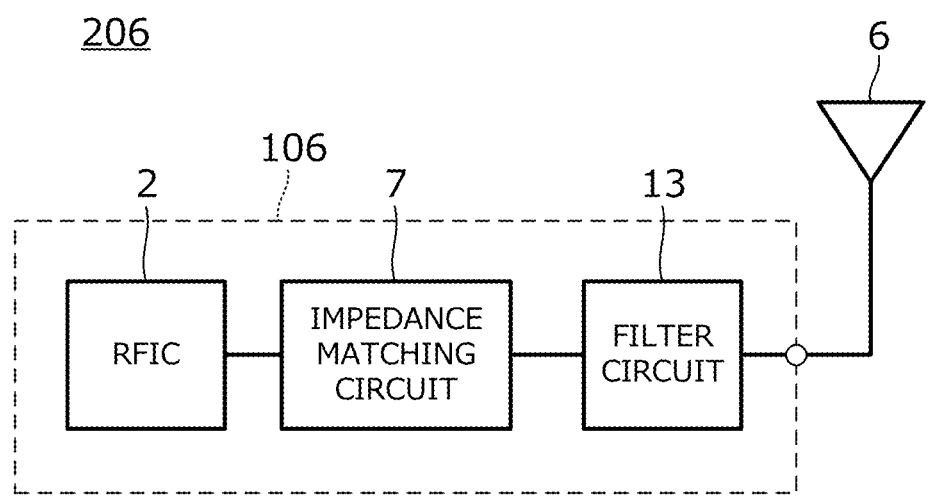
FIG. 15 is a block diagram illustrating a configuration of an RFIC module 106 and an RFID tag 206 according to a sixth exemplary embodiment.

FIG. 15 is a block diagram illustrating a configuration of an RFIC module 106 and an RFID tag 206 according to the sixth embodiment. The RFIC module 106 includes the RFIC 2, the impedance matching circuit 7, and a filter circuit 13. The RFID tag 206 includes the RFIC module 106 and the antenna 6. The filter circuit 13 includes an LC circuit, and is a low-pass filter or a band pass filter that passes a frequency of a communication signal and attenuates a signal in an unnecessary frequency band. The filter circuit 13 is an example of a circuit element in the present invention.

The configurations of the RFIC 2, the impedance matching circuit 7, and the antenna 6 are similar to those of the examples described above. As described above, the filter circuit can be provided as the imparting circuit.

Seventh Exemplary Embodiment

In the seventh exemplary embodiment, an example of an RFIC module having an energy harvesting circuit and an RFID tag including the RFIC module will be described.

Figure 16:
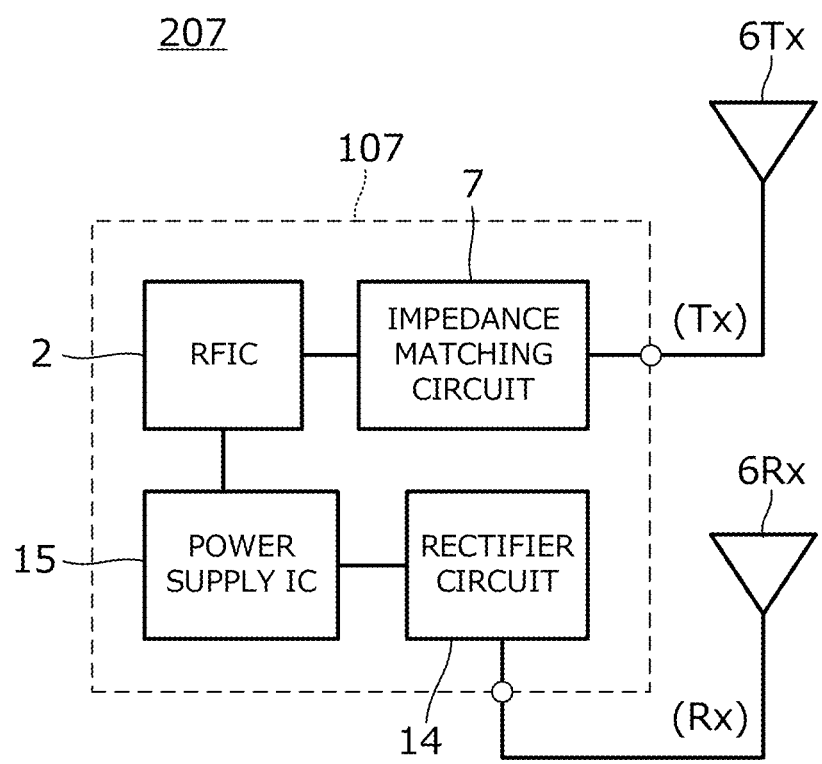
FIG. 16 is a block diagram illustrating a configuration of an RFIC module 107 and an RFID tag 207 according to a seventh exemplary embodiment.

FIG. 16 is a block diagram illustrating a configuration of an RFIC module 107 and an RFID tag 207 according to the seventh embodiment. The RFIC module 107 includes the RFIC 2, the impedance matching circuit 7, a rectifier circuit 14, and a power supply IC 15. The RFID tag 207 includes the RFIC module 107, a transmission antenna 6Tx, and a power receiving antenna 6Rx. The transmission antenna 6Tx transmits a transmission signal Tx, and the power receiving antenna 6Rx receives a power reception signal Rx.

The rectifier circuit 14 rectifies the voltage of the power reception signal Rx induced in the power receiving antenna 6Rx or the induced current to generate DC power. The power supply IC 15 converts the DC power output from the rectifier circuit 14 into a predetermined stabilized power supply voltage and supplies the power supply voltage to the RFIC 2 or the like. The rectifier circuit 14 and the power supply IC 15 constitute an energy harvesting circuit.

The power receiving antenna 6Rx receives, for example, a signal of a frequency band used in wireless power transfer (WPT). For example, a signal having frequencies of 20.05 kHz to 38 kHz, 42 kHz to 58 kHz, 62 kHz to 100 kHz, 425 kHz to 524 kHz, 6,765 kHz to 6,795 kHz, or the like is received, in an exemplary aspect. The rectifier circuit 14 includes a resonance circuit that resonates in the frequency band to be used or a matching circuit that takes matching in the frequency band to be used.

As described above, the energy harvesting circuit can be provided as the imparting circuit.

Eighth Exemplary Embodiment

In the eighth exemplary embodiment, an example of an RFIC module having an amplifier circuit and an RFID tag including the RFIC module will be described.

Figure 17A:
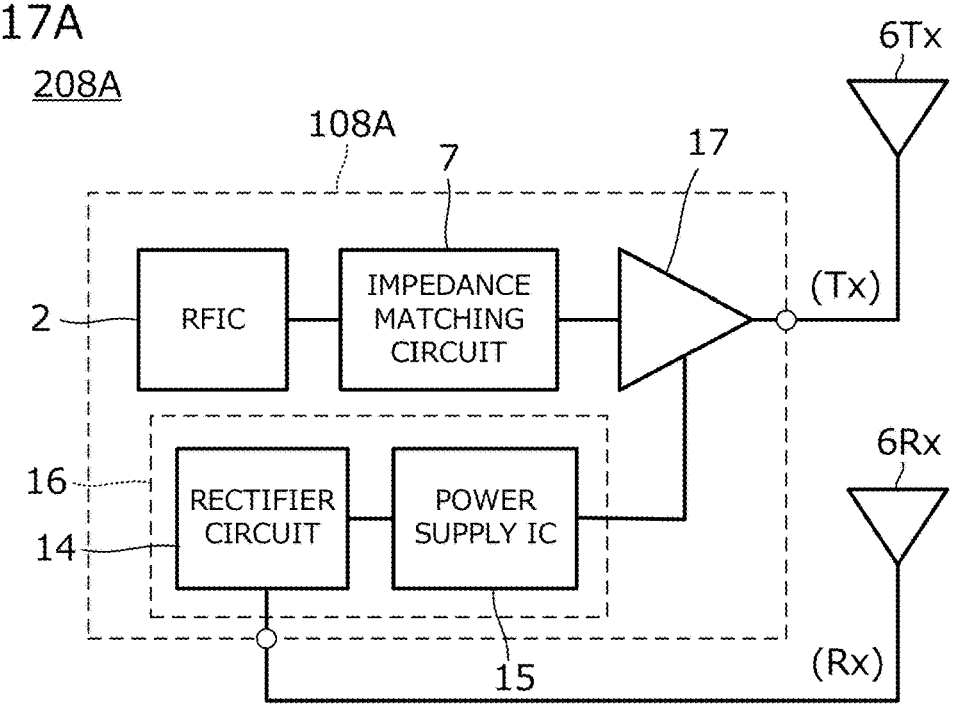
FIG. 17A is a block diagram illustrating a configuration of an RFIC module 108A and an RFID tag 208A according to an eighth exemplary embodiment.
Figure 17B:
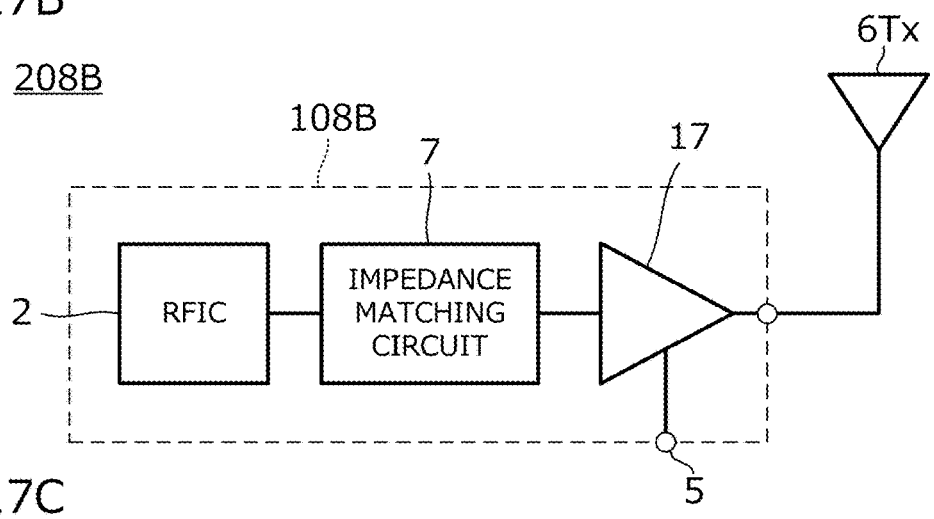
FIG. 17B is a block diagram illustrating a configuration of another RFIC module 108B and another RFID tag 208B according to the eighth exemplary embodiment.
Figure 17C:
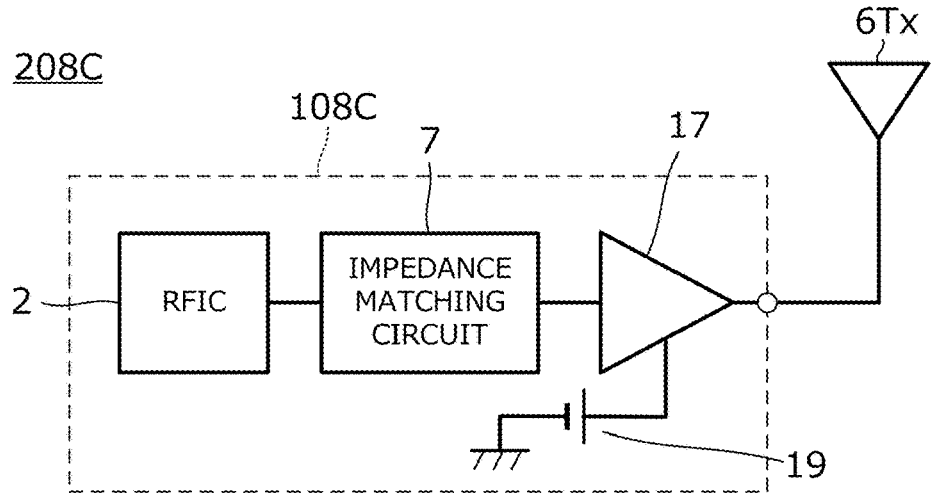
FIG. 17C is a block diagram illustrating a configuration of still another RFIC module 108C and still another RFID tag 208C according to the eighth exemplary embodiment.

FIG. 17A is a block diagram illustrating a configuration of an RFIC module 108A and an RFID tag 208A according to the eighth embodiment. FIG. 17B is a block diagram illustrating a configuration of another RFIC module 108B and another RFID tag 208B according to the eighth embodiment. FIG. 17C is a block diagram illustrating a configuration of still another RFIC module 108C and still another RFID tag 208C according to the eighth embodiment.

An RFIC module 108A illustrated in FIG. 17A includes the RFIC 2, the impedance matching circuit 7, the rectifier circuit 14, the power supply IC 15, and an amplifier 17. The RFID tag 208A includes the RFIC module 108A, the transmission antenna 6Tx, and the power receiving antenna 6Rx.

In operation, the rectifier circuit 14 rectifies a voltage induced in the power receiving antenna 6Rx or an induced current to generate DC power. The power supply IC 15 converts the DC power output from the rectifier circuit 14 into a predetermined stabilized power supply voltage and supplies the power supply voltage to the amplifier 17. The rectifier circuit 14 and the power supply IC 15 constitute an energy harvesting circuit.

Moreover, the amplifier 17 power-amplifies the transmission signal that is output from the RFIC 2 and input via the impedance matching circuit 7 to output the transmission signal to the transmission antenna 6Tx.

As described above, the amplifier 17 and an energy harvesting circuit 16 that supplies power thereto can be provided as the imparting circuit.

The RFIC module 108B illustrated in FIG. 17B includes the RFIC 2, the impedance matching circuit 7, the amplifier 17, and a power supply terminal 5. The RFID tag 208B includes the RFIC module 108B and the transmission antenna 6Tx.

The power supply terminal 5 receives a DC power supply voltage from the outside and supplies the power supply voltage to the amplifier 17. The amplifier 17 power-amplifies the transmission signal that is output from the RFIC 2 and input via the impedance matching circuit 7 to output the transmission signal to the transmission antenna 6Tx.

As described above, the power supply terminal 5 that supplies the power supply voltage from the outside to the imparting circuit, such as the amplifier 17, can be provided.

An RFIC module 108C illustrated in FIG. 17C includes the RFIC 2, the impedance matching circuit 7, the amplifier 17, and the battery 19. The RFID tag 208C includes the RFIC module 108C and the transmission antenna 6Tx.

The battery 19 supplies a power supply voltage to the amplifier 17. The amplifier 17 power-amplifies the transmission signal that is output from the RFIC 2 and input via the impedance matching circuit 7 to output the transmission signal to the transmission antenna 6Tx.

As described above, the battery 19 that supplies the power supply voltage to the imparting circuit such as the amplifier 17 may be provided.

Ninth Exemplary Embodiment

In the ninth exemplary embodiment, an example of an RFIC module having a switch or a duplexer and an RFID tag including the RFIC module will be described.

Figure 18A:
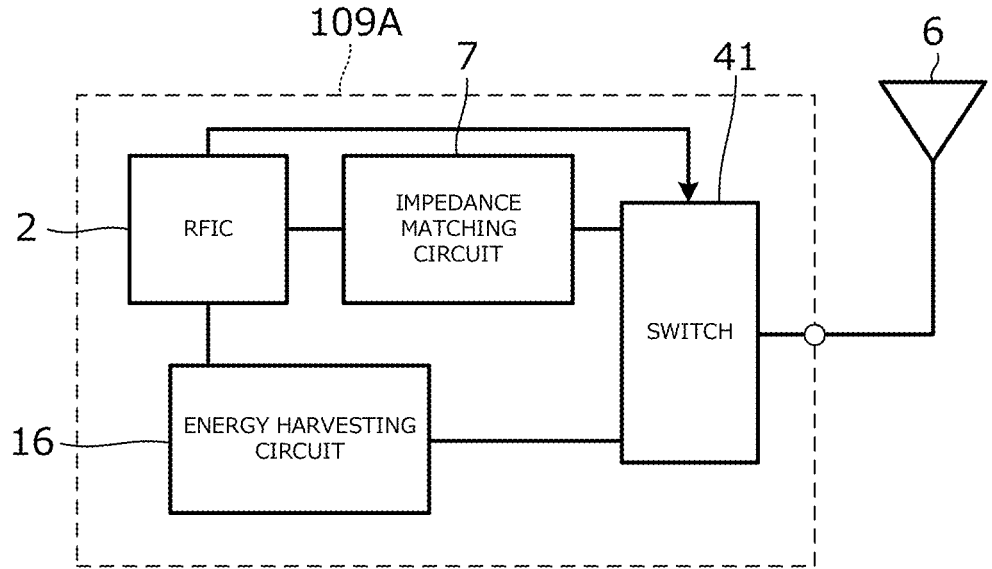
FIG. 18A is a block diagram illustrating a configuration of an RFIC module 109A and an RFID tag 209A according to a ninth exemplary embodiment.
Figure 18B:
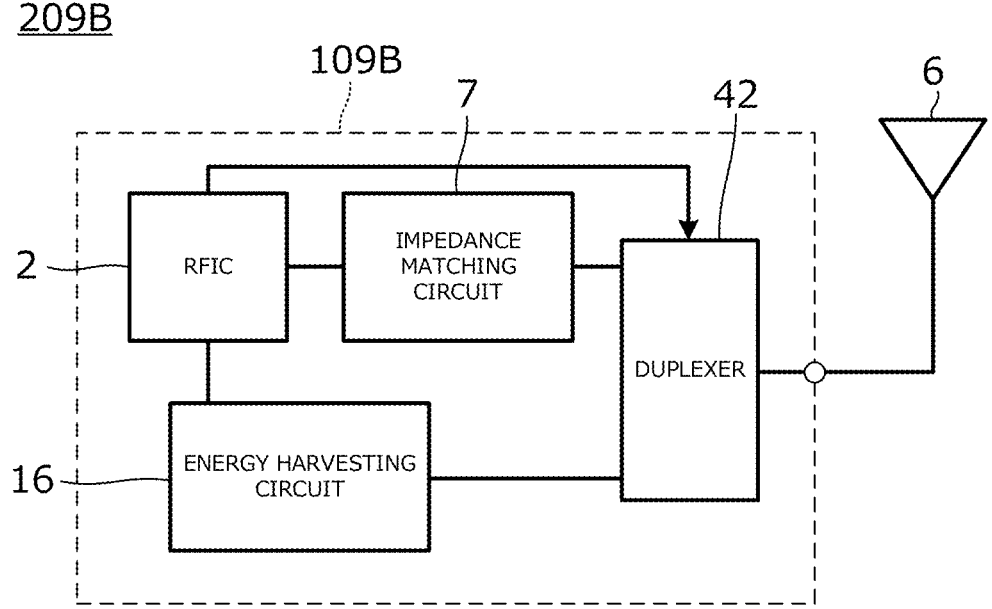
FIG. 18B is a block diagram illustrating a configuration of another RFIC module 109B and another RFID tag 209B according to the ninth exemplary embodiment.

FIG. 18A is a block diagram illustrating a configuration of an RFIC module 109A and an RFID tag 209A according to the ninth embodiment. FIG. 18B is a block diagram illustrating a configuration of another RFIC module 109B and another RFID tag 209B according to the ninth embodiment.

As shown an RFIC module 109A illustrated in FIG. 18A includes the RFIC 2, the impedance matching circuit 7, the energy harvesting circuit 16, and a switch 41. The RFID tag 209A includes the RFIC module 109A and the antenna 6.

The energy harvesting circuit 16 is a circuit in which the rectifier circuit 14 and the power supply IC 15 illustrated in FIG. 17A are configured by one IC. The switch 41 is a circuit that switches between a state where the transmission signal is supplied to the antenna 6 and a state where the power reception signal is supplied to the energy harvesting circuit 16, and is switched by a control signal from the RFIC 2.

An RFIC module 109B illustrated in FIG. 18B includes the RFIC 2, the impedance matching circuit 7, the energy harvesting circuit 16, and a duplexer 42. The RFID tag 209B includes the RFIC module 109B and the antenna 6.

The energy harvesting circuit 16 is a circuit in which the rectifier circuit 14 and the power supply IC 15 illustrated in FIG. 17A are configured by one IC. The duplexer 42 includes two frequency filter circuits, supplies a transmission signal (e.g., a signal of a transmission frequency) to antenna 6, and supplies a power reception signal (e.g., a signal of a power reception frequency) to the energy harvesting circuit 16.

As described above, by providing the switch 41 or the duplexer 42, the transmission of the transmission signal and the power reception of the power reception signal may be performed by a single antenna.

Tenth Exemplary Embodiment

In the tenth exemplary embodiment, an example of an RFIC module having a memory or a sensor and an RFID tag including the RFIC module will be described.

Figure 19A:
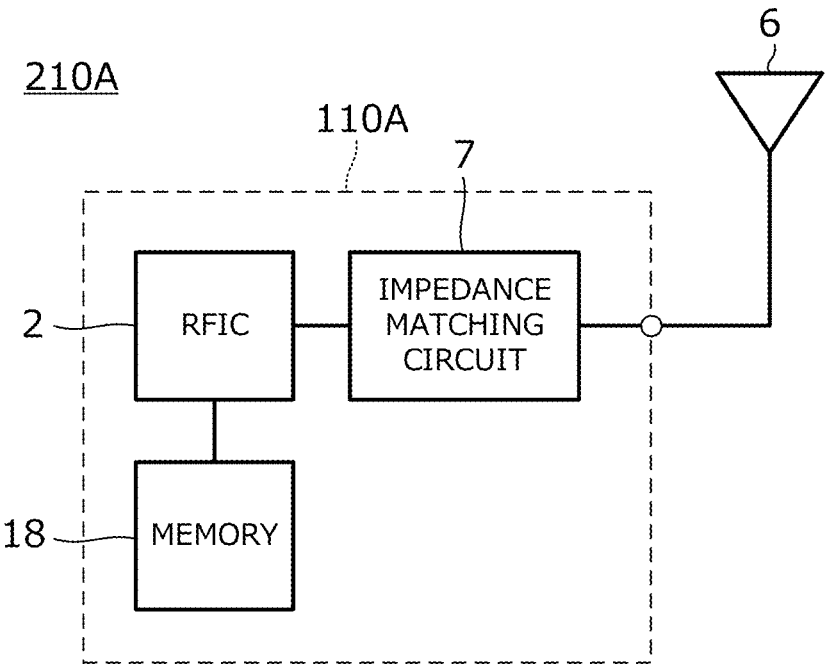
FIG. 19A is a block diagram illustrating a configuration of an RFIC module 110A and an RFID tag 210A according to a tenth exemplary embodiment.
Figure 19B:
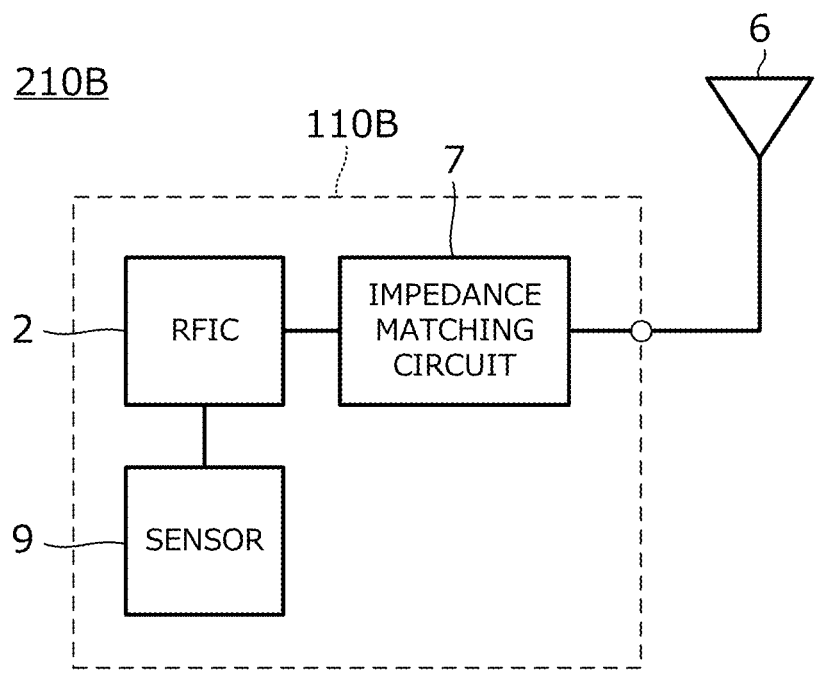
FIG. 19B is a block diagram illustrating a configuration of another RFIC module 110B and another RFID tag 210B according to the tenth exemplary embodiment.

FIG. 19A is a block diagram illustrating a configuration of an RFIC module 110A and an RFID tag 210A according to the tenth embodiment. FIG. 19B is a block diagram illustrating a configuration of another RFIC module 110B and another RFID tag 210B according to the tenth embodiment.

An RFIC module 110A illustrated in FIG. 19A includes the RFIC 2, the impedance matching circuit 7, and a memory 18. The memory 18 is a chip component separate from the RFIC 2. The RFID tag 210A includes the RFIC module 110A and the antenna 6. The RFIC 2 transmits an ID and reads/writes data from/to the memory 18.

The RFIC module 110B illustrated in FIG. 19B includes the RFIC 2, the impedance matching circuit 7, and the sensor 9. The sensor 9 is a sensor component or a sensor circuit that detects a predetermined variable. The RFID tag 210B includes the RFIC module 110B and the antenna 6. The RFIC 2 transmits an ID, reads a detection signal by the sensor 9, and performs processing according to the value. For example, enabling/disabling the operation of the RFIC 2 is switched according to whether the detection value of the sensor 9 exceeds a predetermined value. Alternatively, the RFIC 2 is configured to wirelessly transmit a detection value of the sensor 9.

As described above, the memory 18 and the sensor 9 can be provided as the imparting circuit in an exemplary aspect.

Finally, it is noted generally that the description of the above-described embodiments is illustrative in all respects and is not restrictive. Modifications and changes can be made as appropriate by those skilled in the art.

For example, in the examples illustrated in FIGS. 1A, 1B, 2, and the like, the antenna-side first terminal electrode 11 and the conductor pattern 61P of the antenna are capacitively coupled, and the antenna-side second terminal electrode 12 and the conductor pattern 62P of the antenna are capacitively coupled. However, this capacitively coupled portions each may be directly (e.g., in a direct current manner) connected. In addition, one portion may be directly connected and the other portion may be capacitively coupled.

REFERENCE SIGNS LIST

Ca, C11, C12 capacitor
CC1, CC2 chip capacitor
Cp parasitic capacitance
L1 first inductor
L11, L12 conductor pattern of first inductor
L2 second inductor
L21, L22 conductor pattern of second inductor
L3 third inductor
L4 fourth inductor
L5 fifth inductor
V1, V2 via conductor
1 substrate
2 RFIC
3 protective film
4 cover lay film
5 power supply terminal
6 antenna
6Rx power receiving antenna
6Tx transmission antenna
7 impedance matching circuit
9 sensor
10 imparting circuit
11 antenna-side first terminal electrode
12 antenna-side second terminal electrode
13 filter circuit
14 rectifier circuit
15 power supply IC
16 energy harvesting circuit
17 amplifier
18 memory
19 battery
21, 22 RFIC terminal
31 RFIC-side first terminal electrode
32 RFIC-side second terminal electrode
41 switch
42 duplexer
60 insulator film
61, 61P, 61L, 61C conductor pattern
62, 62P, 62L, 62C conductor pattern
101, 102A, 102B, 103A, 103B, 104, 105, 106, 107, 108A, 108B, 108C, 109A, 109B, 110A, 110B RFIC module
201, 202, 206, 207, 208A, 208B, 208C, 209A, 209B, 210A, 210B RFID tag

The invention claimed is:

1. An RFIC module comprising:
a substrate;
an RFIC mounted on the substrate and configured to perform a passive communication;
an RFIC-side terminal electrode disposed on the substrate and connected to the RFIC;
antenna-side terminal electrodes disposed on the substrate and each to be directly connected or capacitively coupled to an antenna;
an impedance matching circuit disposed on the substrate and connected to the RFIC-side terminal electrode and the antenna-side terminal electrodes;
a sensor configured to detect a variable measured of an external environment; and
an imparting circuit disposed on the substrate and configured to switch between enabling and disabling of an operation of the RFIC based on the detected variable measured by the sensor.

2. The RFIC module according to claim 1, wherein the imparting circuit is a circuit element connected to the RFIC.

3. The RFIC module according to claim 1, further comprising a battery configured to supply a power supply voltage for the imparting circuit.

4. The RFIC module according to claim 1, wherein the imparting circuit is a circuit element connected to the impedance matching circuit.

5. The RFIC module according to claim 1, wherein the impedance matching circuit includes first and second inductors having first portions disposed on an upper surface of the substrate and second portions disposed on a lower surface of the substrate.

6. The RFIC module according to claim 5, wherein the impedance matching circuit further includes third, fourth and fifth inductors disposed on the lower surface of the substrate.

7. The RFIC module according to claim 6, wherein the first and third inductors and the second and fourth inductors are disposed in positional relationships to sandwich a mounting position of the RFIC.

8. The RFIC module according to claim 5, wherein the impedance matching circuit further includes third and fourth inductors disposed on the lower surface of the substrate and a further imparting circuit is connected between respective ends of the third and fourth inductors.

9. The RFIC module according to claim 8, wherein the further imparting circuit is configured to adjust a bandwidth based on a value of a detected variable by a further sensor.

10. The RFIC module according to claim 1, wherein the sensor is configured to detect the variable as at least one of a temperature, a humidity, an acceleration, an inclination, a pressure, a bending strain, a received light amount, a received light wavelength, a sound volume, a received sound frequency, a gas, and a static electricity.

11. The RFIC module according to claim 10, wherein the imparting circuit is configured to switch between the enabling and the disabling of the operation when the detected variable falls within a predetermined range or is outside the predetermined range.

12. An RFID tag comprising:
a radiating element; and
an RFIC module according to claim 1.

13. The RFID tag according to claim 12, further comprising a circuit element connected to the radiating element.

14. An RFIC module comprising:
a substrate;
an RFIC mounted on the substrate and configured to perform a passive communication;
an RFIC-side terminal electrode disposed on the substrate and connected to the RFIC;
antenna-side terminal electrodes disposed on the substrate and each directly connected or capacitively coupled to an antenna;
an impedance matching circuit disposed on the substrate and connected to the RFIC-side terminal electrode and the antenna-side terminal electrodes;
a sensor configured to detect a variable measured of an external environment; and
an imparting circuit disposed on the substrate and configured to switch between enabling and disabling of an operation of the RFIC based on the detected variable measured by the sensor,
wherein the RFIC-side terminal electrodes comprise a pair of RFIC-side terminal electrodes and the RFIC comprises a pair of terminals mounted to the pair of RFIC-side terminal electrodes, respectively.

15. The RFIC module according to claim 14, wherein the imparting circuit is connected between the pair of RFIC-side terminal electrodes.

16. An RFIC module comprising:
a substrate;
an RFIC mounted on the substrate by at least one RFIC-side terminal electrode;
a plurality of antenna-side terminal electrodes disposed on the substrate and each directly connected or capacitively coupled to an antenna;
an impedance matching circuit disposed on the substrate and connected to the at least one RFIC-side terminal electrode and the plurality of antenna-side terminal electrodes;
a sensor configured to measure a value of an environment variable that is external of the RFIC module; and
an imparting circuit disposed on the substrate and configured to switch an operation of the RFIC based on the measured value of the environment variable.

17. The RFIC module according to claim 16, further comprising a battery configured to supply a power supply voltage for the imparting circuit.

18. The RFIC module according to claim 16,
wherein the at least one RFIC-side terminal electrode comprises a pair of RFIC-side terminal electrodes and the RFIC comprises a pair of terminals mounted to the pair of RFIC-side terminal electrodes, respectively, and
wherein the imparting circuit is connected between the pair of RFIC-side terminal electrodes.

19. The RFIC module according to claim 16, wherein the sensor is configured to detect the environment variable as at least one of a temperature, a humidity, an acceleration, an inclination, a pressure, a bending strain, a received light amount, a received light wavelength, a sound volume, a received sound frequency, a gas, and a static electricity.

20. The RFIC module according to claim 19, wherein the imparting circuit is configured to switch the operation of the RFIC when the measured value of the environment variable falls within a predetermined range or is outside the predetermined range.

* * * * *